(12) United States Patent
Babonneau et al.

(10) Patent No.: US 8,537,904 B2
(45) Date of Patent: Sep. 17, 2013

(54) PRE-PROCESSING DEVICE AND METHOD BEFORE ENCODING OF A VIDEO IMAGE SEQUENCE

(75) Inventors: Jean-Yves Babonneau, L'Hermitage (FR); Jacky Dieumegard, Paris (FR); Olivier Le Meur, Talensac (FR)

(73) Assignee: Thomson Licensing, Boulogne-Billancourt (FR)

( * ) Notice: Subject to any disclaimer, the term of this patent is extended or adjusted under 35 U.S.C. 154(b) by 1474 days.

(21) Appl. No.: 11/630,071

(22) PCT Filed: Jun. 22, 2005

(86) PCT No.: PCT/EP2005/052908
§ 371 (c)(1),
(2), (4) Date: Sep. 7, 2007

(87) PCT Pub. No.: WO2006/003102
PCT Pub. Date: Jan. 12, 2006

(65) Prior Publication Data
US 2008/0152021 A1    Jun. 26, 2008

(30) Foreign Application Priority Data
Jul. 1, 2004   (FR) .................................... 04 51381

(51) Int. Cl.
*H04N 7/12*   (2006.01)
(52) U.S. Cl.
USPC ................................................... 375/240.29
(58) Field of Classification Search
USPC ................ 375/240.01, 240.29; 348/607, 701
See application file for complete search history.

(56) References Cited

U.S. PATENT DOCUMENTS

| 5,731,836 A | * | 3/1998 | Lee ........................... 375/240.16 |
| 5,768,438 A | | 6/1998 | Etoh |
| 5,953,076 A | * | 9/1999 | Astle et al. .................... 348/584 |
| 6,064,776 A | * | 5/2000 | Kikuchi et al. ............... 382/260 |

(Continued)

FOREIGN PATENT DOCUMENTS

| JP | 10003546 | 1/1998 |
| JP | 10023429 | 1/1998 |
| JP | 2001352546 | 12/2001 |
| WO | WO 01/77871 | 10/2001 |

OTHER PUBLICATIONS

I. Kim et al.: "The Block-Based Preprocessing System for the Coding Performance Improvement", IEEE Transactions of Consumer Electronics, IEEE Inc. New York, US vol. 44, No. 3, Aug. 1998, pp. 1048-1053.

(Continued)

*Primary Examiner* — Kambiz Zand
*Assistant Examiner* — Hilary Branske
(74) *Attorney, Agent, or Firm* — Tutunjian & Bitetto, P.C.

(57) ABSTRACT

The invention relates to a method of processing an image of a video image sequence, wherein it comprises the following successive steps:
a step for computing a complexity value representative of the complexity of said image;
a first step of morphological processing applied on said image, said first step generating a first processed image;
a second step for mixing said image and said first processed image depending on said complexity value, said second step generating a mixed image;
a third step of morphological processing applied on said mixed image, said third step generating a second processed image; and
a fourth step for mixing said mixed image and said second processed image depending on said complexity value.

5 Claims, 2 Drawing Sheets

(56) References Cited

U.S. PATENT DOCUMENTS

Figure 1:
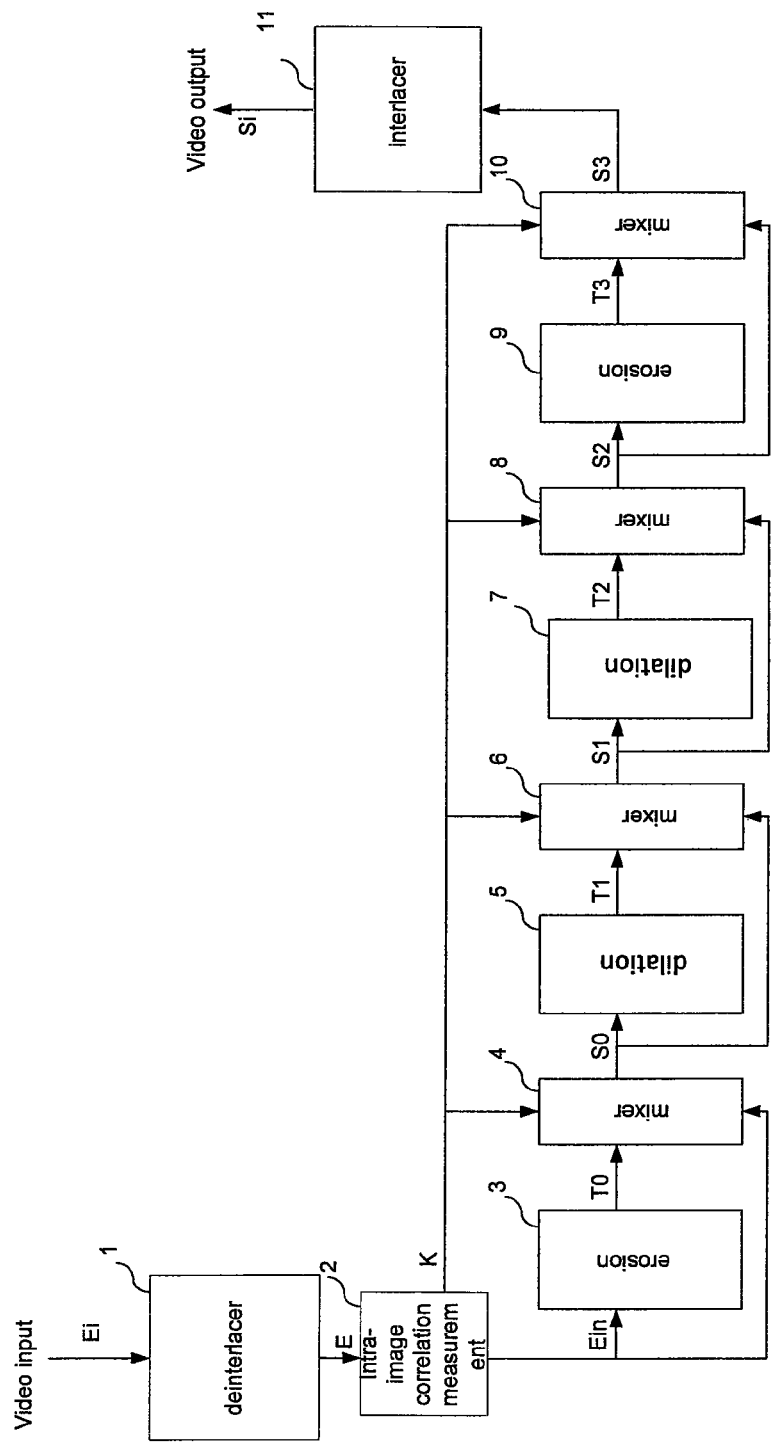

2002/0150166 A1 10/2002 Johnson
2003/0016868 A1* 1/2003 Oh et al. .................. 382/190
2005/0185716 A1 8/2005 Babonneau et al.

OTHER PUBLICATIONS

R.A. Peters: "A New Algorithm for Image Noise Reduction Using Mathematical Morphology" IEEE Transactions on Image Processing, IEEE New York, US, vol. 4, No. 5, May 1, 1995, pp. 554-568.

A. Bellini et al: "Fuzzy perceptual filtering for still image compression" Fuzzy Systems Proceedings, 1998, IEEE World Congress on Computational Intelligence. The 1998 IEEE Int'l Conf. on Anchorage, AK, USA May 4-9, 1998, pp. 1637-1642.

S. Mukhopadhyay et al: "An edge preserving noise smoothing technique using multiscale morphology" Signal Processing, Amsterdam, NL, vol. 82, No. 4, Apr. 2002, pp. 527-544.

The Search Report Dated Aug. 30, 2005.

* cited by examiner

PRE-PROCESSING DEVICE AND METHOD BEFORE ENCODING OF A VIDEO IMAGE SEQUENCE

This application claims the benefit, under 35 U.S.C. §365 of International Application PCT/EP2005/052908, filed Jun. 22, 2005, which was Published in accordance with PCT Article 21 (2)on Jan. 12, 2006 in English and which claims the benefit of French patent application No. 0451381, filed Jul. 1, 2004.

The invention relates to a pre-processing device and method before encoding of a video image sequence.

The image encoding devices become all the more effective as the temporal or spatial entropy of the images they encode reduces.

They are therefore often associated with image pre-processing devices in which the images are processed in order to allow a better encoding.

As is known, the pre-processing devices for reducing the entropy of a video sequence use linear or non-linear filters which reduce, even eliminate, the high-frequency components that are mainly responsible for the image encoding cost in intra mode. There are numerous filters available, including one- or two-dimensional low-pass filters, Nagao filters, averaging filters and median filters.

The main drawbacks with these methods are:
a reduction in spatial definition that is too visible, in particular in the vertical axis, due to the fact that each frame of an interlaced video has only half the vertical resolution of an image,
blurring effects on the objects,
degraded contours.

The invention proposes to resolve at least one of the above-mentioned drawbacks.

To this end, the invention proposes a pre-processing device before encoding of a video image sequence, characterized in that it comprises:
means of applying a plurality of morphological processing steps to the video image sequence,
mixers for applying a weighting, after each morphological processing step, to the video sequence having been subjected to one of said processing steps.

Applying a raw morphological processing would have a devastating effect on the quality of the image. The presence of a mixer between each morphological operator weights the effect of this processing by mixing the raw result of the operator and the input of the same operator.

According to a preferred embodiment, the device comprises means of measuring the complexity of said video image sequence before applying the plurality of morphological processing steps.

In practice, a pre-processing for reducing the spatial entropy of the image is recommended mainly for images with high complexity. Thus the pre-processing can be controlled according to the complexity of the image and suited to the complexity of the image.

Advantageously, the means of measuring the complexity of said video image sequence measure the intra-image correlation.

According to a preferred embodiment, the means of measuring the complexity compute a weighting coefficient for each mixer.

Advantageously, the weighting coefficient is identical for each mixer.

Advantageously, the weighting coefficients are inversely proportional to the intra-image correlation.

Preferably, the means of applying a plurality of morphological processing steps and the mixers apply the processing steps to the luminance component of the video signal, pixel by pixel, for each image.

Preferably, the device comprises:
means of deinterlacing said video image sequence before measuring the intra-image correlation and
means of interlacing said video sequence after the last weighting.

This makes it possible to obtain progressive frames which each contain the complete vertical definition of an image. It is then possible to consider without bias a processing in both axes of the image, horizontal and vertical.

The invention also relates to a method of pre-processing before encoding a video image sequence. According to the invention, the method comprises:
a plurality of morphological processing steps on the incoming video image sequence,
a plurality of weighting steps for applying, after each morphological processing step, a weighting to the result of the morphological processing.

Figure 2:
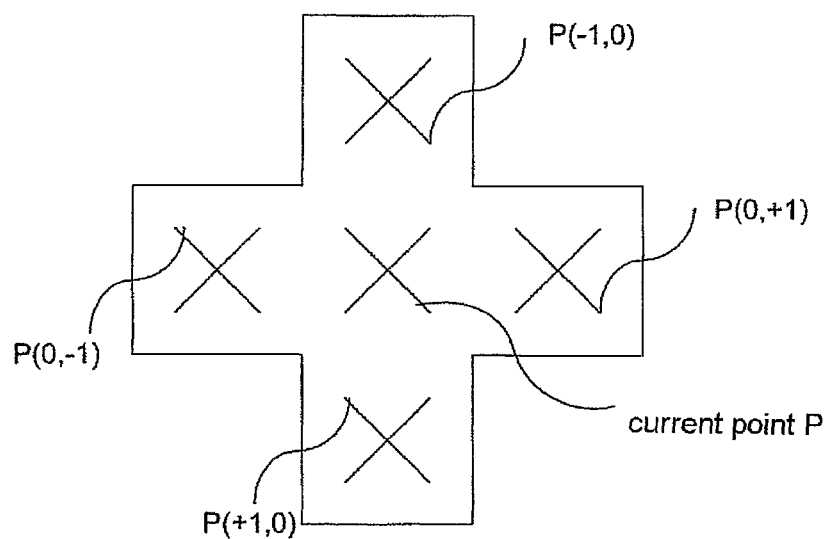

The invention will be better understood and illustrated by means of examples of embodiments and advantageous implementations, by no means limiting, with reference to the appended figures in which:

FIG. 1 represents a preferred embodiment of a device according to the invention, FIG. 2 represents the vicinity of the current point P taken into account to define the complexity of the current image.

The modules represented are functional units, which may or may not correspond to physically distinguishable units. For example, these modules, or some of them, may be grouped in a single component, or form functionalities of one and the same software. Conversely, certain modules may, if necessary, comprise separate physical entities.

The video signal Ei at the input of the pre-encoding device is an interlaced type video signal.

In order to improve the performance of the pre-encoding device, the video signal Ei is deinterlaced by the deinterlacer 1. The deinterlacer 1 doubles the number of lines per field of the video signal Ei using a deinterlacing method known to a person skilled in the art based on three consecutive fields of the video signal Ei. Progressive format is then obtained, where each field is becoming frame and contains the complete vertical definition of an image, so that a processing can be performed in the vertical axis.

The signal E is obtained at the output of the deinterlacer 1.

A complexity analysis of the image is then carried out. In practice, spatial entropy reduction is applied mainly to images having a high spatial entropy.

The device therefore includes upstream means 2 of measuring the correlation of each image.

FIG. 2 illustrates an example of the vicinity taken into account for computing the complexity of the current image in the module 2.

For each pixel of the image, the pixel result "Rp" is computed using the luminance of the current point and that of four of its neighbours:

$$Rp=[abs(P-P(-1,0))+abs(P-P(0,-1))+abs(P-P(0,+1))+abs(P-P(+1,0))]/4$$

Then, all these pixel results are accumulated over one frame.

$$C_{intra} = \frac{\sum_{0}^{nbpixels} Rp}{nblignes \times nbcol}$$

This correlation measurement is used to ascertain the average deviation, over one image, between a pixel and its adjacent pixels. Interesting information on the definition in the image is thus obtained.

In other embodiments, it is possible to modify these equations in order to obtain a more complete definition of the complexity of the image. It is also possible to enlarge the vicinity of the current pixel taken into account in computing the image complexity.

From this measurement, a coefficient K is computed within the range [0,1], as a function of the complexity of the incoming images.

The table below illustrates the values of the coefficient K as a function of $C_{intra}$, given as an illustration only.

The value of Cintra is encoded on 8 pixels and is therefore between 0 and 255.

| Correlation type | $C_{intra}$ value | Coefficient K value |
| --- | --- | --- |
| Very strong | $C_{intra}$ = [0 . . . 2] | 1/8 = Kmin |
| Strong | $C_{intra}$ = [2 . . . 4] | 2/8 |
| Average | $C_{intra}$ = [5 . . . 8] | 3/8 |
| Weak | $C_{intra}$ = [9 . . . 16] | 4/8 |
| Very weak | $C_{intra}$ = [17 . . . 30] | 5/8 |
| Insignificant | $C_{intra}$ = [30 . . . 255] | 6/8 = Kmax |

When the correlation is very strong (very little definition), the pre-processing of the image is still performed, but in lesser proportions, illustrated by the value of the coefficient K.

Conversely, a weak correlation is an indicator of strong entropy. The example of a random noise (weak, even zero correlation) is a good example (high entropy).

The coefficient K can be the same for each mixer as in the preferred embodiment or different for all the mixers.

The processing carried out in the device of FIG. 1 is applied only to the luminance component of the video.

In practice, a processing of the chrominance component may provoke disagreeable artefacts in colour, and, above all, it is the luminance component that has most of the complexity of the image.

The signal $E_{in}$ (identical to the signal E) at the output of the module 2 is then subjected to erosion in the module 3. The erosion process consists in keeping the pixel that has the minimum luminance value among the pixels of a structuring element that it receives as input. The structuring element comprises a 3*3 window, three rows by three columns, around the current pixel, or 9 pixels. However, another window size can be found bearing in mind that the size of the window is directly proportional to the severity of the erosion.

The module 3 therefore computes for each pixel of the incoming video signal $E_{in}$, its new luminance value.

The video signal T0 at the output of the module 3 therefore represents the eroded signal $E_{in}$, or therefore for each pixel, its luminance value modified in relation to T0 corresponding to the minimum value of the structuring element of which it is part.

Then, the signal T0 is transmitted to a mixer 4. The mixer 4 also receives as input the coefficient K transmitted by the module 2.

The mixer 4 produces as output the signal S0 according to the following formula:

$$s0 = K \times T0 + (1-K) \times Ein$$

The signal S0 is input into the dilation module 5.

The dilation operation consists in retaining the pixel that has the maximum luminance value among the elements of a structuring element centered on the current pixel, with a size of 3×3=9 pixels.

The dilation module produces as output a new video signal T1 transmitted to the input of a mixer 6. The mixer 6 also receives as input the weighting coefficient K.

The mixer 6 then produces a signal S1 according to the following formula by weighting, for each pixel, the luminance value that it receives as input:

$$S1 = K \times T1 + (1-K) \times S0$$

The signal S1 is then input into a second dilation module 7.

The dilation module 7 then performs a dilation operation on the signal S1. The dilation operation consists in retaining the pixel that has the maximum luminance value among the elements of a structuring element centered on the current pixel with a size of 3×3=9 pixels.

The module 7 then produces as output a signal T2 which is input into the mixer 8 which weights the luminance component of the signal received, for each pixel received. The mixer 8 also receives as input the weighting coefficient K.

The mixer 8 produces as output a signal S2, according to the formula $$S2 = K \times T2 + (1-K) \times S1$$

The signal S2 is then input into a second erosion module 9.

The module 9 applies erosion to the signal S2, the erosion operation consisting as indicated previously in replacing the current pixel with the minimum pixel among the pixels of the structuring element defined as previously.

The erosion module 9 produces as output a signal T3 which is input into a fourth mixer 10. The mixer 10 also receives as input the weighting coefficient K.

The mixer produces as output a signal S3 according to the following formula:

$$S3 = K \times T3 + (1-K) \times S2$$

The signal S3 is then transmitted to the input of an interlacer 11 which is used to interlace the signal S3 in order to obtain the video output Si of the pre-processing device which is then transmitted to an encoding device.

The incoming video signal Si then benefits from a reduced spatial entropy and its subsequent encoding is made easier. Any encoding type can be considered subsequently.

Naturally, the invention is not limited to the embodiment described above. A person skilled in the art will easily understand that modifying the number of morphological operations of the pre-processing device can be considered, as can modifying the number of associated mixers.

An erosion followed by a dilation is called an opening.
A dilation followed by an erosion is called a closing.

The invention claimed is:

1. A method of pre-processing an image of an interlaced video image sequence before encoding, wherein the method comprises the following successive steps:
   deinterlacing said image into a deinterlaced image
   computing a complexity value representative of the complexity of said image;
   applying an erosion on said deinterlaced image to generate a first processed image;

linearly combining said deinterlaced image and said first processed image depending on a first weighting coefficient (K) computed from said complexity value, said linearly combining step generating a mixed image;

applying a dilation on said mixed image to generate a second processed image; and linearly combining said mixed image and said second processed image depending on said complexity value.

2. Method according to claim 1, wherein said complexity value is the intra-image correlation.

3. Method according to claim 1, wherein said first and weighting coefficient is equal to a second weighting coefficient.

4. Method according to claim 3, wherein said first and second weighting coefficients are proportional to said complexity value.

5. A device for pre-processing an image of a video image sequence before encoding, wherein it the device comprises:

a module configured to deinterlace said image into a deinterlaced image;

a module configured to compute a complexity value representative of the complexity of said image;

a module configured to apply an erosion on said deinterlaced image, said applying module generating a first processed image;

a module configured to linearly combine said deinterlaced image and said first processed image depending on a first weighting coefficient (K) computed from said complexity value, said mixing module generating a mixed image;

a module configured to apply a dilation on said mixed image, said applying module generating a second processed image; and a module configured to linearly combine said mixed image and said second processed image depending on a second weighting coefficient (K) computed from said complexity value.

\* \* \* \* \*